July 8, 1952     R. J. FRANCIS     2,602,766
REINFORCED PLASTIC RODS AND METHODS OF MAKING SAME
Filed April 10, 1948     3 Sheets-Sheet 1
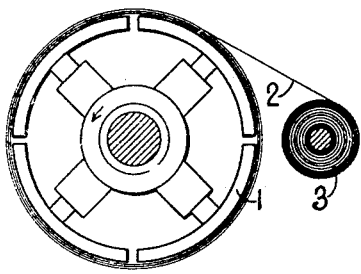
Fig. 1
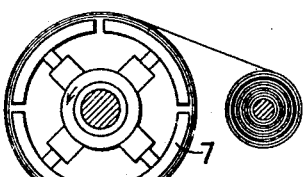
Fig. 2
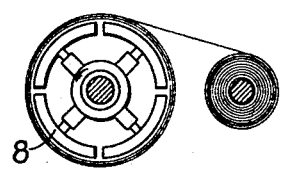
Fig. 3
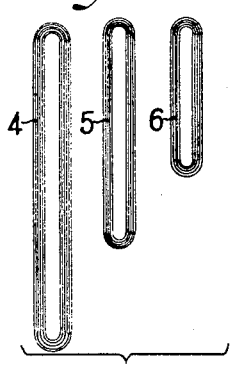
Fig. 4    Fig. 5    Fig. 6
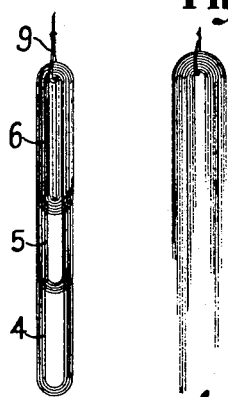
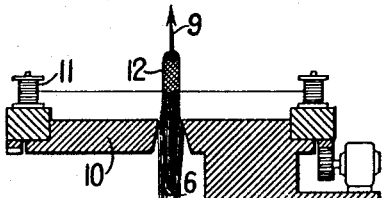
Fig. 7
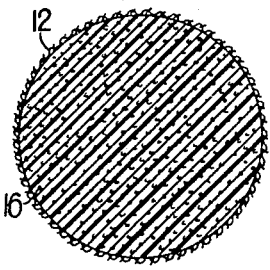
Fig. 8
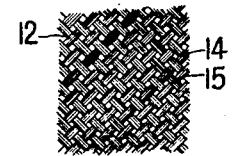
Fig. 9    Fig. 10    Fig. 11
INVENTOR.
*Richard J. Francis.*
BY July 8, 1952  R. J. FRANCIS  2,602,766
REINFORCED PLASTIC RODS AND METHODS OF MAKING SAME
Filed April 10, 1948  3 Sheets-Sheet 2

INVENTOR.
Richard J. Francis.
BY

July 8, 1952   R. J. FRANCIS   2,602,766
REINFORCED PLASTIC RODS AND METHODS OF MAKING SAME
Filed April 10, 1948   3 Sheets-Sheet 3
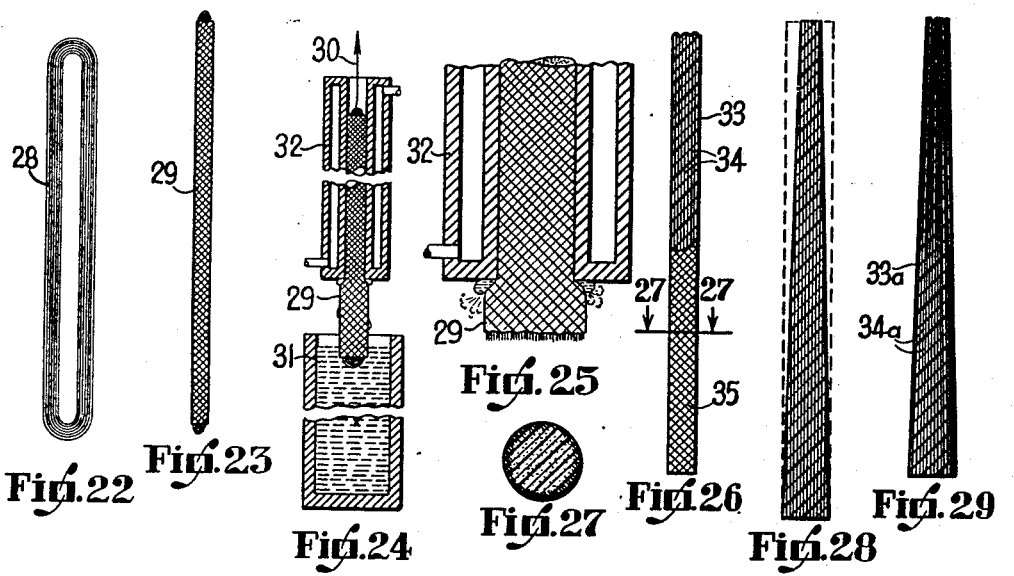
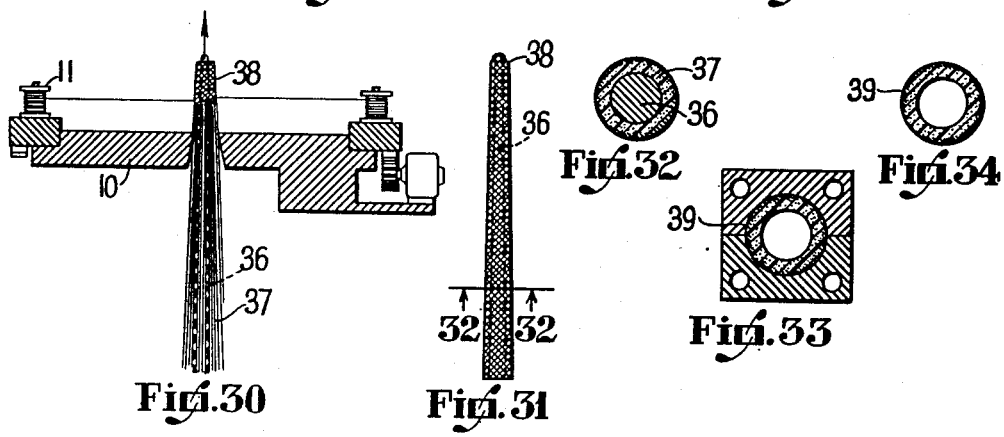
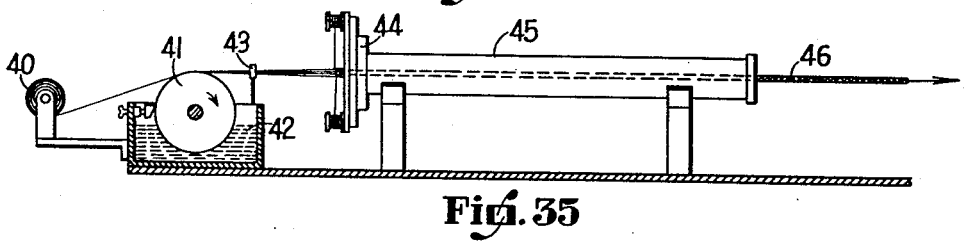
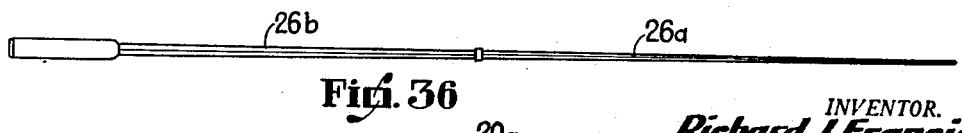
INVENTOR.
Richard J. Francis Patented July 8, 1952

2,602,766

UNITED STATES PATENT OFFICE 2,602,766

REINFORCED PLASTIC RODS AND METHODS OF MAKING SAME

Richard J. Francis, Granville, Ohio

Application April 10, 1948, Serial No. 20,195

30 Claims. (Cl. 154—91)

My invention relates to reinforced plastic rods and method of making the same. It has to do, more particularly, with reinforced plastic rods which are made from thermosetting resins, such as polyester or phenolic resins, reinforced with fiber or strand reinforcement, or fabric where the bulk of the yarn is predominantly in one direction, for example, strands, of low or no twist, or fibers of glass. The reinforced plastic rods of my invention are particularly suitable for use as fishing rods although they are capable of many other uses. The rods may be either solid or hollow depending upon the use for which they are intended.

One of the objects of my invention is to provide a reinforced plastic rod of great structural strength, the reinforcement being so incorporated within and distributed within the rod that distribution of impact or concentrated point loading throughout the rod is obtained.

Another object of my invention is to provide a rod of the type indicated in the preceding paragraph which is particularly suitable for use as a fishing rod due to the fact that the reinforcement is so arranged that the rod will have improved resistance to delamination and peeling and will have torsional strength as well as flexural strength.

Another object of my invention is to provide a reinforced plastic rod which is of tapered form so that it will vary in flexibility at various points throughout its length but will have a greater percentage of reinforcement in the smaller cross-sections thereof to give the smaller portions of the rod adequate strength while allowing bending.

Still another object of my invention is to provide a simple, effective and economical method for making reinforced plastic rods of the type indicated above, such methods being adaptable to large scale commercial production of the rods.

Various other objects will be apparent from the drawings and the following description.

As previously indicated, in producing rods according to my invention, I prefer to use polyester or phenolic resins reinforced with glass fibers, although other types of fiber reinforcement and other types of thermosetting resins may be employed. I first form from the glass fibers or glass yarn what I term a preform of the yarn. This preform is preferably produced from one or more lengths of loops or skeins of yarn. If the rod is to be tapered, a plurality of loops are employed which are of different lengths. These loops are stretched to their full lengths with one end of each of the loops coinciding with the corresponding ends of the other loops. It will be apparent that this will result in a greater number of strands at one end of the preform and that there will be a lesser number of strands intermediate the ends and still a lesser number at the opposite end. If the preform is made from a single length of loop of the strands, the number of strands will be uniform throughout the length of the rod. If this uniform preform is molded in a rod of uniform cross-section, then the ratio of reinforcement to resin will be constant along the length of the rod. If, however, this uniform preform is molded in a rod of variable cross-section, then the molded rod will have a higher ratio of reinforcement to resin at the portions of smaller cross-sections than at the portions of larger cross-sections. The preform for the tapered rod or the preform for the uniform rod preferably is then covered with a braided covering of the yarn throughout the length of the preform. The preform is then disposed in the liquid resin so that all the strands are impregnated with the resin and the interstices between the strands are filled with resin to form a reinforced resin mass or the preform is disposed in a mold which is then filled with the resin. During molding, the plastic is cured to form the completed reinforced plastic rod. The strands or yarns not only extend longitudinally of the rod, due to the use of the loops in the preform, but also extend around the rod adjacent the outer surface thereof, due to the use of the braided covering or similarly disposed strands around the preform. Thus, the rod not only will have flexural strength but also torsional strength. In the case of the tapered rod which is formed by using the plurality of loops of yarns, the rod preferably will be completed in a tapered mold which will receive in its smaller end the smaller end of the yarn preform. However, the yarn in the smaller end of the rod will be in greater percentage as compared to the resin at such end so as to give the smaller end of the rod greater reinforcement even though it is more flexible.

In the accompanying drawings, I have illustrated rods made according to my invention and also the method of making such rods. In these drawings:

Figure 1 is a diagrammatic view showing how the largest length of loops of the tapered preform of yarn is made.

Figure 2 is a similar view showing how the next size length of loops is made.

Figure 3 is a similar view showing how the smallest length of loops is made.

Figure 4 is a view showing the three lengths of loops disposed side by side in extended condition.

Figure 5 is a view showing the lengths combined preparatory to covering them with a braided cover to form the final preform.

Figure 6 shows how each of the loops may be cut slightly to one side of its lowest point, if desired.

Figure 7 shows the composite unit of Figure 5 being provided with a braided cover.

Figure 8 is a view of the completed preform.

Figure 9 is an enlarged view of one end of the preform.

Figure 10 is an enlarged view of a small area of the braided covering of the preform.

Figure 11 is a transverse sectional view taken along line 11—11 of Figure 8 through the preform.

Figure 22 is a view illustrating a single length of loops of yarn which may be used as the reinforcement in a rod of uniform cross-section.

Figure 23 shows the length of loops after it has been provided with a braided covering.

Figure 24 shows the preform of Figure 23 being pulled from a resin bath into a mold.

Figure 25 is an enlarged view which illustrates the preform going into the mold and shows how it is being compressed.

Figure 26 is a side elevational view partly broken away of the completed rod.

Figure 27 is a transverse sectional view taken through the rod along line 27—27 of Figure 26.

Figure 28 is a vertical sectional view through a completed rod made by using the preform of Figure 23 to produce a rod of uniform cross-section which is then ground to the desired taper.

Figure 29 is a vertical sectional view through a completed rod made by using the preform of Figure 23 and forming the rod in a tapered mold.

Figure 30 is a diagrammatic view illustrating how a mandrel may be inserted within the preform as it is being provided with the braided covering in order to form a hollow rod.

Figure 31 is a view of the preform with the mandrel in position therein.

Figure 32 is a transverse section taken along line 32—32 of Figure 31 showing the mandrel in position within the preform.

Figure 33 is a transverse sectional view through a mold with the mandrel-containing preform in position therein.

Figure 34 is a transverse sectional view through the completed hollow rod.

Figure 35 is a diagrammatic view illustrating apparatus which may be used in continuously forming rods according to my invention.

Figure 36 is a view of a fly rod made from sections of rods produced according to my invention.

Figure 37 is a similar view of a casting rod made from a single section of rod produced according to my invention.

Figure 12:
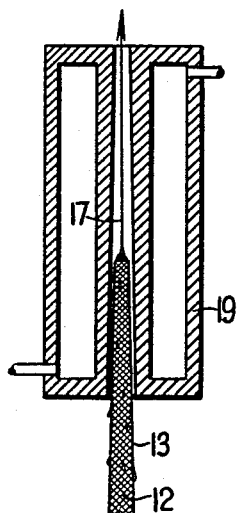
Figure 12 is a diagrammatic view showing the preform as it is pulled from a bath of the liquid resin into a tapered mold.

With reference to the drawings, in Figures 1 to 9, inclusive, I have illustrated how a preform of glass yarn can be formed for use in a tapered rod. As shown in Figure 1, a wheel 1 is provided on which the yarn 2 is wound from a spool 3. A measured quantity will be wound on the wheel merely by turning the wheel a predetermined number of revolutions. Then the resulting length of loops or skein of yarn will be slipped therefrom and will be in the form of the largest length 4 of Figure 4. The shorter lengths 5 and 6 are similarly formed on the wheels 7 and 8, respectively, of Figures 2 and 3. Thus, as shown in Figure 4, the three different lengths 4, 5 and 6 will be provided. Of course, any desired number of these lengths of loops can be provided and of any suitable lengths depending upon the length of the tapered rod to be produced.

The lengths 4, 5 and 6 are then superimposed, as shown in Figure 5, with one of their ends in alignment and secured together by a loop of wire 9. The next operation is illustrated in Figure 7. While the unit of Figure 5 is held by the wire 9 with the three lengths extended, it is positioned in a braiding machine 10 of any suitable type. This machine 10 carries a plurality of spools 11 of glass yarn and a covering 12 is braided on the loops throughout the length thereof. The resulting preform 13 is illustrated in Figure 7. It will comprise the lengths 4, 5 and 6 enclosed within the braided cover 12. As shown in Figures 8, 9 and 10, the braided cover 12 will consist of strands 14 extending helically in one direction and strands 15 extending helically in the other direction braided with each other. Thus, the preform will consist of a soft mass of the elongated strands 16, as shown in Figure 9, with the strands 14 and 15 extending helically around the surface of the preform. It will be apparent that all of these strands are spaced from each other. If desired and before braiding, the lengths 4, 5 and 6 of Figure 5 may each be cut slightly to one side of its lowest point to provide ends at substantially six different levels and to therefore double the number of steps or shoulders on the preform.

Figure 13:
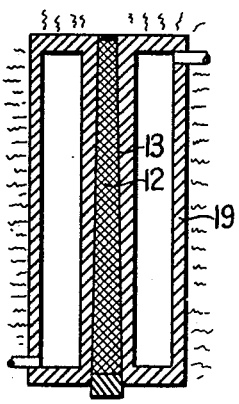
Figure 13 is a diagrammatic view showing the preform being cured in the mold which may be heated and then cooled.

The tapered preform of Figure 8 is inverted and suspended by a second wire 17 which is attached to the opposite end of the length 4 or to the braided covering 12. The covering facilitates handling of the reinforcement. The preform is immersed in a bath 18 of the resin and is lifted therefrom by the wire 17. The uncured resin will be in liquid form and will be sufficiently thin to impregnate the yarn of the preform but will be sufficiently viscous or tacky to adhere to the yarn and fill the interstices of the preform, binding all the strands thereof into a single mass. The resulting soft viscous mass is then pulled up into the tapered mold 19 which will cause the mass to be compressed into a solid reinforced resin mass which will then be cured. The curing operation is performed in the mold 19, as indicated in Figure 13, by first heating the mold and then cooling it by circulating suitable media therethrough.

Figure 14:
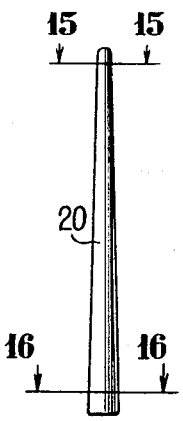
Figure 14 is a side elevational view of the completed tapered rod.
Figure 15:
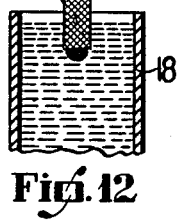
Figure 15 is a transverse sectional view taken through the smaller end of the rod along line 15—15 of Figure 14.
Figure 15:
Figure 16:
Figure 16 is a similar view through the larger end of the rod along line 16—16 of Figure 14.

The finished rod 20, after being removed from the mold 19, will have the appearance indicated in Figure 14. The rod may gradually taper uniformly or non-uniformly from one end to the other so that it will have varying degrees of flexibility throughout its length. The rod is reinforced by the elongated strands or filaments 16 which are formed by the lengths of loops 4, 5 and 6 which are surrounded by the resin 21 in which they are embedded. Adjacent the surface of the rod, it is reinforced by the braided covering 12. However, this covering 12 is also embedded in the resin so that the outer surface of the rod is a smooth continuous surface 22 of resin. Thus, the article will have flexural strength due to the longitudinal reinforcement 16 and torsional strength due to the braided reinforcement 12 which extends around the rod adjacent the surface thereof. Thus, this rod will be suitable for a fishing rod where flexural as well as torsional strength is important. It will be noted from a comparison of Figures 15 and 16 that the glass strands 16 are more dense at the small end of the rod than at the larger end thereof. This will result in more reinforcement in percentage to the resin at the small end of the rod and, consequently, sufficient strength at the small end even though it is more flexible.

Figure 17:
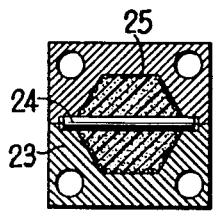
Figure 17 is a transverse sectional view taken along line 17—17 of Figure 18 through a tapered mold in which the preform may be disposed and the rod molded.
Figure 18:
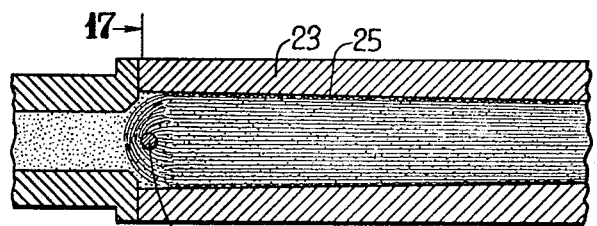
Figure 18 is a longitudinal sectional view through the mold showing resin being injected therein.
Figure 19:
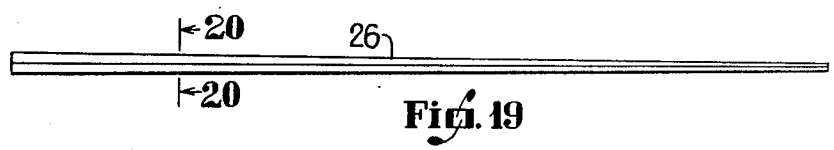
Figure 19 is a side elevational view of the rod made in the mold of Figures 17 and 18.
Figure 20:
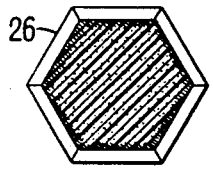
Figure 20 is a transverse section through the rod taken along line 20—20 of Figure 19.
Figure 21:
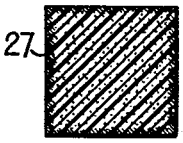
Figure 21 is a similar view but showing a rod of square cross-section.

Another way in which the rod can be produced is illustrated in Figures 17 and 18. In this instance, I use a split mold 23. This mold will have removable pins 24 for disposition transversely in the cavity 25 thereof. The preform of Figure 8 will be carried by these pins and will be mounted in the cavity of the mold. Then as shown in Figure 18, the resin may be injected into the mold under pressure. The hollow mold may then be supplied with heating medium to heat the mold and to cure the resin therein producing the rod 26 of Figure 19. It will be noted that the mold cavity 25 is of hexagonal cross-section and will produce a rod 26 of hexagonal cross-section. The braided covering 12 will be adjacent the surface of the rod and the elongated strands 21 will be embedded in the rod and extend longitudinally thereof. Instead of making a hexagonal rod any suitable shape may be produced depending upon the shape of the mold cavity. For example, a square rod 27 shown in Figure 21 may be produced. Furthermore, the rod need not necessarily be molded in tapered form.

In Figure 22, I show a single length of loops 28 which may be used for producing a rod of uniform cross-section. This length 28 may be formed on the wheel 1. It is then placed in extended condition in the braiding machine and provided with the braided cover 29. A wire 30 is attached to one end of the preform 28, the preform is suspended in a bath 31 of resin, and is then pulled upwardly into a mold 32 of uniform cross-section. However, as shown in Figure 25, the mold cavity is of such size that the preform will be compressed into a solid mass. This mass is cured in the mold and the rod 33 of Figure 26 is produced. The rod 33 will be of uniform cross-section and uniform density throughout its length. As shown in Figure 26, this rod will consist of the longitudinal filaments or strands 34, produced by the length of loops 28, and the strands 35 extending around the rod adjacent the surface thereof, and produced by the braided cover 12, all of these strands being completely embedded in the resin.

In Figure 28, I have illustrated how the rod of Figure 26 of uniform cross-section and made with the preform of Figure 22, can be ground into taper form. The dotted lines show the rod before grinding and the full lines show it after grinding. In case the longitudinal fibers 34 in the rod will be so arranged that some at the center of the rod will extend the complete length of the rod while those towards the outer surface will extend to the surface of the taper at different points along the rod. A similar arrangement can be obtained by using an over-size tapered rod and grinding it to a smaller cross-section.

In Figure 29, I have illustrated a rod 33a made in a tapered mold using a single length of loops to form a preform of the type shown in Figure 23. This will result in the forming of a rod having all of the fibers 34a extending the full length thereof. However, it will automatically result in fiber orientation such that the larger end of the rod will be high in resin, suitable for the butt end of a fishing rod, and the smaller end will be high in reinforcement, suitable for the tip of the fishing rod. This tapered rod can be used as a blank and can be ground to other desired taper.

It is sometimes desirable to make the rod hollow and this is accomplished as illustrated in Figures 30 to 34. To accomplish this, the preform is formed from a single length of loops as in Figure 22 and one end of the length is sheared off to permit a mandrel 36 to be centrally disposed within the group of strands as shown in Figure 30. This mandrel may be straight or tapered but is shown tapered. The unit is then disposed in a braiding machine like that shown in Figure 7. The resulting preform shown in Figures 31 and 32 will include the centrally disposed mandrel 36 surrounded by the longitudinally extending strands 37 and the braided covering 38. With the mandrel still in position, the preform may be placed in a tapered mold, as shown in Figure 33, where resin is injected and where the unit is cured. The resulting hollow rod 39 will appear as in Figure 34 after removal from the mold and after removal from the mandrel. This rod will include the longitudinal strands 37 and the braided covering 38 all embedded in the resin.

In Figure 35, I illustrate apparatus for continuously forming a rod of uniform cross-section along its length. In this apparatus, a plurality of strands of reinforcement will be simultaneously fed from a reel 40. These strands will pass over a drum 41 which rotates in a bath 42 of resin so as to impregnate and coat the strands with resin. The strands will then pass through a guide 43 which will group them into a group of adjacent strands. This group of strands will then pass through the braiding machine 44 which will apply a braided cover that also will become impregnated with resin because of the excess on the group of strands. From the braiding machine 44 the resin-carrying preform passes continuously through a mold 45 which will compress the mass and cause the strands to adhere together. While passing through the mold 45, which will be heated, the rod will be cured. The rod 46 will be in completed form as it emerges from the mold 45.

In Figure 36, I illustrate a fly rod which is made of two sections 26a and 26b. The base section 26b is hollow and of the type illustrated in Figure 34 except that it preferably is of hexagonal form but may be of any other desired cross-section. The tip section 26a is solid and preferably of the type shown in Figure 19, although it may be like that of Figures 14, 28 or 29. In Figure 37, I illustrate a casting rod 20a made of a rod of the type shown in Figures 19, 28 or 29. This rod may be of hexagonal, circular or other suitable cross-section.

It will be apparent from the above description that I have provided a reinforced plastic rod of great strength both in regard to flexural strength as well as torsional strength and with marked resistance to delamination or peeling. The reinforcement is so incorporated within the rod and distributed therein that impact or concentrated point loading on the rod will be distributed throughout the rod. The rod may be constructed in tapering form so as to have varying flexibility and may have the reinforcement denser at the smaller end to give it sufficient strength. The method of producing it is simple and economical. The preform of reinforcement is such that it not only imparts strength to the finished article but can be handled easily during the process of forming the rod since it is provided with the braided cover.

Various other advantages will be apparent.

Having thus described my invention, what I claim is:

1. A reinforced plastic rod having both flexural and torsional strength comprising reinforcement embedded in and completely enclosed within a cured thermosetting resin, said reinforcement arranged in the form of elongated strands extending longitudinally of the rod and strands extending around the rod adjacent the surface thereof, the strands which extend around the rod extending helically in both directions and being braided together.

2. A reinforced plastic rod according to claim 1 wherein the longitudinal strands extend the full length of the rod.

3. A reinforced plastic rod according to claim 1 which is of tubular form.

4. A reinforced plastic rod according to claim 1 formed of a thermosetting resin in which glass strands are disposed.

5. A reinforced plastic rod according to claim 1 wherein the resin is a polyester resin.

6. A reinforced plastic rod according to claim 1 wherein the resin is a phenolic resin.

7. A reinforced plastic rod having both flexural and torsional strength comprising reinforcement embedded in and completely enclosed within a cured thermosetting resin, said reinforcement arranged in the form of elongated strands extending longitudinally of the rod and strands extending around the rod adjacent the surface thereof, the strands which extend around the rod extending helically in both directions and being braided together, the rod being tapered and the percentage of reinforcement to resin varying at different points along the length of the rod.

8. A rod according to claim 7 wherein the reinforcing strands extend the full length of the rod.

9. A rod according to claim 7 wherein the reinforcing strands towards the center of the rod extend the full length thereof while those towards the outer surface terminate at the tapered surface at different points therealong.

10. The method of forming a reinforced plastic rod which comprises producing a preform of yarn by forming it into a length of loops and then braiding a covering of yarn around the stretched length, impregnating the strands of yarn with resin and filling the spaces between the strands with resin, compressing the resin-carrying preform into the form of a rod, and then curing the resin to form the completed rod.

11. A method according to claim 10 wherein a single length of loops of yarn is used which extends the full length of the rod and wherein the yarn is braided into strands extending helically in both directions around the said length.

12. A method according to claim 10 wherein a plurality of different lengths of loops of yarn are formed and the lengths are superimposed with one of their ends in alignment before the braided cover is applied thereto, and then the resulting preform is impregnated with and covered with a resin and is cured in a tapered mold.

13. A method according to claim 12 wherein the non-aligning ends of the lengths of loops are cut so that the cut ends of each length will be out of alignment.

14. The method of forming a reinforced plastic rod which comprises forming a series of different lengths of loops of yarn, aligning one of the ends of said lengths and extending the lengths, braiding a covering of yarn over the lengths while extended, immersing the resulting preform unit in a bath of a thermosetting resin, compressing the unit in a tapered mold with the larger end of the preform in the larger end of the mold, and then subjecting the mold to heat to cure the resin.

15. The method of forming a reinforced plastic rod which comprises forming a length of loops of reinforcing yarns, placing the length in extended condition within a mold, and then injecting thermosetting resin into the mold, and finally heating the mold to cure the resin.

16. The method of forming a reinforced plastic rod which comprises forming a length of loops of yarn of substantially the length of the rod to be formed, immersing the length in extended form in a bath of a thermosetting resin, and then pulling the length through a mold of suitable cross-section to compress the unit and cause the yarns to adhere to each other, and heating the mold to cure the resin.

17. A method according to claim 14 wherein the loop is first provided with a braided covering of yarn before being disposed in the mold.

18. A method according to claim 16 wherein the length of yarn is provided with a braided covering of yarn before being immersed in the bath of resin.

19. A method of forming a reinforced plastic rod which comprises continuously feeding a plurality of strands of yarn over a roller coated with thermosetting resin, combining the strands into a single group which will adhere to each other, braiding a covering of yarn on the group and passing the resulting unit continuously through a mold which compresses it and which cures the resin.

20. A method of forming a tapered reinforced plastic rod which comprises forming a preform of elongated strands and embedding the preform in a tapered mass of resin while the strands are arranged so that they extend the full length of the rod but are spaced apart differently at different points along the rod.

21. A method of forming a reinforced plastic rod which comprises molding a resin mass into a uniform rod with elongated strands of reinforcement extending the full length thereof and then grinding the rod to tapered form to expose the ends of some of the strands at the tapered surface.

22. A reinforced plastic rod having both flexural and torsional strength comprising reinforcement embedded in and completely enclosed within a cured thermosetting resin, said reinforcement being arranged in the form of elongated strands extending longitudinally of the rod and strands extending around the rod adjacent the surface thereof, the strands which extend around the rod extending helically in both directions and being braided together, the longitudinal strands being arranged in groups which extend for different portions of the length of the rod.

23. A reinforced plastic rod according to claim 22 which is tapered with the larger end of the rod containing the greater number of strands.

24. A reinforced plastic rod according to claim 23 wherein the reinforcing in the smaller end of the rod is more dense than in the larger end of the rod.

25. A reinforced plastic rod according to claim 22 which is of tubular form.

26. A reinforced plastic rod according to claim 22 wherein the strands are of glass.

27. A reinforced plastic rod having both flexural and torsional strength comprising reinforcement embedded in and completely enclosed within a cured thermosetting resin, said reinforcement being arranged in the form of elongated strands extending longitudinally of the rod and strands extending around the rod adjacent the surface thereof, the strands which extend around the rod extending helically.

28. A reinforced plastic rod according to claim 27 of tubular form.

29. A reinforced plastic rod according to claim 27 wherein the longitudinal strands extend for different portions of the length of the rod.

30. A reinforced plastic rod of tapered form comprising reinforcement embedded in and completely enclosed within a cured thermosetting resin, said reinforcement being arranged in the form of elongated strands extending longitudinally of the rod, the longitudinal strands extending for different portions of the length of the rod and the ends of some of the strands being exposed at the tapered surface.

RICHARD J. FRANCIS.

REFERENCES CITED

The following references are of record in the file of this patent:

UNITED STATES PATENTS

| Number | Name | Date |
|---|---|---|
| 244,619 | King | July 19, 1881 |
| 1,409,148 | Apple | Mar. 14, 1922 |
| 1,751,911 | Georgi | Mar. 25, 1930 |
| 2,133,183 | Baird et al. | Oct. 11, 1938 |
| 2,175,204 | Lougheed | Oct. 10, 1939 |
| 2,202,014 | Lougheed | May 28, 1940 |
| 2,234,560 | Keyes | Mar. 11, 1941 |
| 2,262,861 | Rugeley et al. | Nov. 18, 1941 |
| 2,308,825 | Rawlings | Jan. 19, 1943 |
| 2,311,704 | Simison | Feb. 23, 1943 |
| 2,309,903 | Hume | Feb. 2, 1943 |
| 2,322,756 | Wallder | June 29, 1943 |
| 2,354,110 | Ford et al. | July 18, 1944 |
| 2,379,881 | Chamberlain | July 10, 1945 |
| 2,392,805 | Biefeld | Jan. 15, 1946 |
| 2,425,293 | McDermott | Aug. 12, 1947 |
| 2,445,231 | McDermott | July 13, 1948 |
| 2,508,521 | Lay | May 23, 1950 |
| 2,571,692 | Dubois | Oct. 16, 1951 |
| 2,573,361 | Rodgers et al. | Oct. 30, 1951 |

FOREIGN PATENTS

| Number | Country | Date |
|---|---|---|
| 502,409 | Great Britain | Mar. 13, 1939 |
| 627,255 | Great Britain | Aug. 4, 1949 |